(12) United States Patent
Gamberini et al.

(10) Patent No.: US 11,006,592 B2
(45) Date of Patent: May 18, 2021

(54) GREENHOUSE FOR UNDERWATER CULTIVATION OF TERRESTRIAL PLANT SPECIES

(71) Applicant: MESTEL SAFETY S.R.l., Milan (IT)

(72) Inventors: Sergio Gamberini, Genoa (IT); Gabriele Cucchia, Genoa (IT)

(73) Assignee: MESTEL SAFETY S.R.L., Milan (IT)

( * ) Notice: Subject to any disclaimer, the term of this patent is extended or adjusted under 35 U.S.C. 154(b) by 338 days.

(21) Appl. No.: 16/225,111

(22) Filed: Dec. 19, 2018

(65) Prior Publication Data

US 2019/0200552 A1 Jul. 4, 2019

(30) Foreign Application Priority Data

Dec. 21, 2017 (IT) .................. 102017000148399

(51) Int. Cl.
| | | |
|---|---|---|
| *A01G 31/06* | (2006.01) | |
| *E02D 29/09* | (2006.01) | |
| *A01G 27/00* | (2006.01) | |
| *A01G 31/02* | (2006.01) | |
| *A01G 9/14* | (2006.01) | |
| *A01G 9/16* | (2006.01) | |
| *A01G 31/00* | (2018.01) | |

(52) U.S. Cl.
CPC .......... *A01G 31/06* (2013.01); *A01G 9/1476* (2013.01); *A01G 9/16* (2013.01); *A01G 27/003* (2013.01); *A01G 31/02* (2013.01); *E02D 29/06* (2013.01); *A01G 2031/006* (2013.01)

(58) Field of Classification Search
CPC .......................... A01G 31/06; A01G 2031/006
See application file for complete search history.

(56) References Cited

U.S. PATENT DOCUMENTS

| | | | | |
|---|---|---|---|---|
| 5,027,550 | A | * 7/1991 | Mori | ...................... A01G 33/00 47/1.4 |
| 2011/0067301 | A1 | 3/2011 | Demitchell | |
| 2012/0247013 | A1* | 10/2012 | Sung | ........................ A01G 7/02 47/39 |

(Continued)

OTHER PUBLICATIONS

OceanReefGroup: "Nemo's Garden-Growing Plants Under the Sea", Jan. 25, 2017, XP054978653; Retrieved from Internet: URL: https://www.youtube.com/watch?v=0aQpXSYsgr4.

*Primary Examiner* — Monica L Barlow
(74) *Attorney, Agent, or Firm* — Cantor Colburn LLP

(57) ABSTRACT

A greenhouse for underwater cultivation of terrestrial plant species comprising a dome (2) suitable for being filled with air in an underwater environment, provided with an aperture (21) for lower access and made of a material that is impermeable to water and permeable to light, such dome comprising means for restraining to the sea floor, and means for adjusting the level of water/air in the dome itself which must ensure that plant species cultivated in the greenhouse always reside above such level.
Inside such dome a system for the automatic irrigation of the cultivated plants is present comprising a tubular structure (3) on which a plurality of mutually spaced holes (31) is provided, inside which supports are placed for housing and cultivating plant species, irrigation water flowing inside such tubular structure and irrigating such supports in order to achieve a hydroponic culture.

11 Claims, 5 Drawing Sheets

(56) References Cited

U.S. PATENT DOCUMENTS

Figure 1:
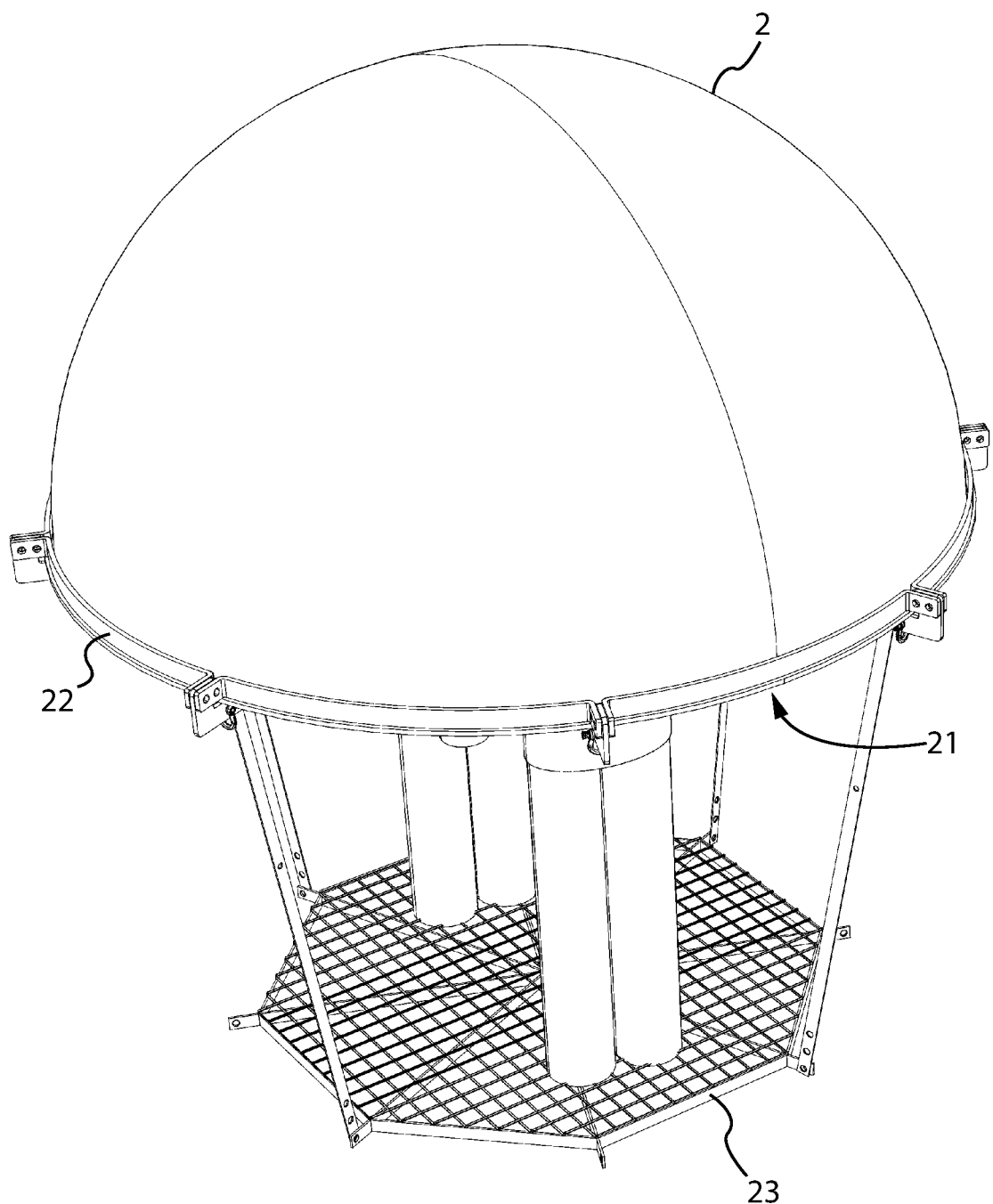

| | | | |
|---|---|---|---|
| 2013/0081354 A1* | 4/2013 | Hoshino | E04B 1/32 |
| | | | 52/745.07 |
| 2014/0083007 A1 | 3/2014 | Galvan | |
| 2014/0137467 A1 | 5/2014 | Gamberini | |
| 2016/0044875 A1* | 2/2016 | Nutter | A01G 13/04 |
| | | | 47/20.1 |
| 2017/0233181 A1* | 8/2017 | Elazari-Volcani | |
| | | | H02K 7/1823 |
| | | | 405/210 |

* cited by examiner

GREENHOUSE FOR UNDERWATER CULTIVATION OF TERRESTRIAL PLANT SPECIES

CROSS REFERENCE TO RELATED APPLICATION

This application is related to and claims the benefit of Italian Patent Application Number 102017000148399 filed on Dec. 21, 2017, the contents of which are herein incorporated by reference in their entirety.

The present invention relates to a greenhouse for underwater cultivation of terrestrial plant species. In particular the present invention relates to a greenhouse which can be arranged a few meters under the level of the sea or of a lake, where it is however lighted by the sunlight filtering through the water column.

As for temperature and sun exposure, the underwater environment is particularly advantageous for cultivating terrestrial plant species which require, in order to grow up optimally, a shaded environment and low thermal excursions.

In fact, already at intermediate depths substantially stable temperatures within the twenty-four hours and sun exposure filtered by the overlying water layer can be observed.

Thus there is a need for creating an underwater-implantable greenhouse making it possible to cultivate terrestrial plant species, despite the absence underwater of oxygen and carbon dioxide in a form that can be assimilated by them.

Accordingly, there is a need for achieving a set of underwater cultivation making it possible to transport seedbeds from and to the underwater greenhouse, in an insulated way from the underwater environment.

Patent IT1414310 to the Applicant itself discloses a greenhouse of such a type comprising a balloon or dome adapted to be filled with air in the underwater environment. Said dome comprises an aperture for lower access, it is made of a material that is impermeable to water and permeable to light and has at least an inner support shelf for housing at least a seedbed. The dome is provided with means for restraining to the bottom of the water basin and with means for adjusting the level of water in the dome itself, such that the seedbed is always exposed to air, therefore above such water level.

The Applicant itself now raises the issue on how to optimize the cultivation of such plant species and particularly on how to efficiently irrigate such plants, as in such an underwater environment optimization of irrigation water is a crucial factor.

Such problem is solved by the present invention which provides an underwater greenhouse for cultivating plant species, provided with an efficient automated irrigation system having the characteristics of claim 1.

Figure 2:
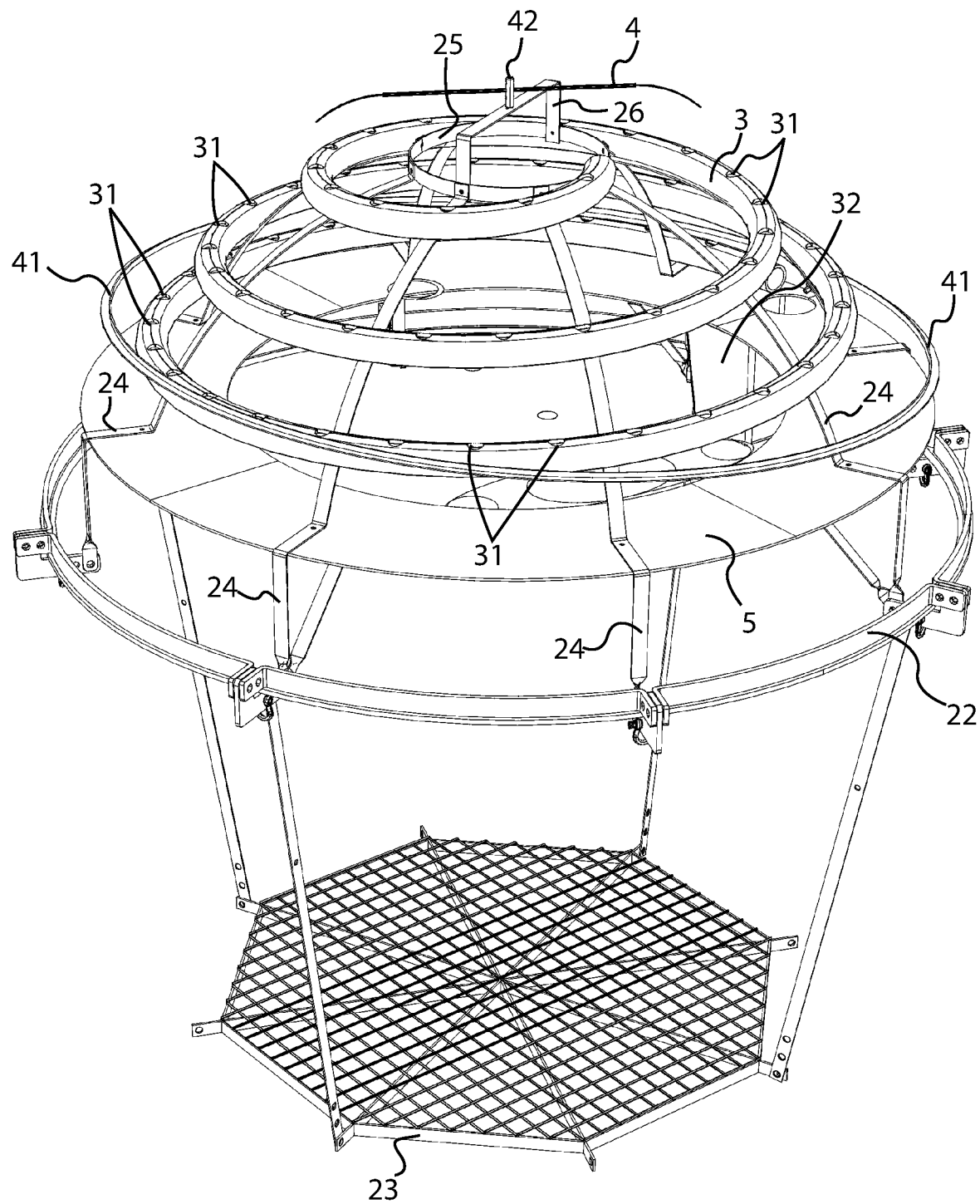
Figure 3:
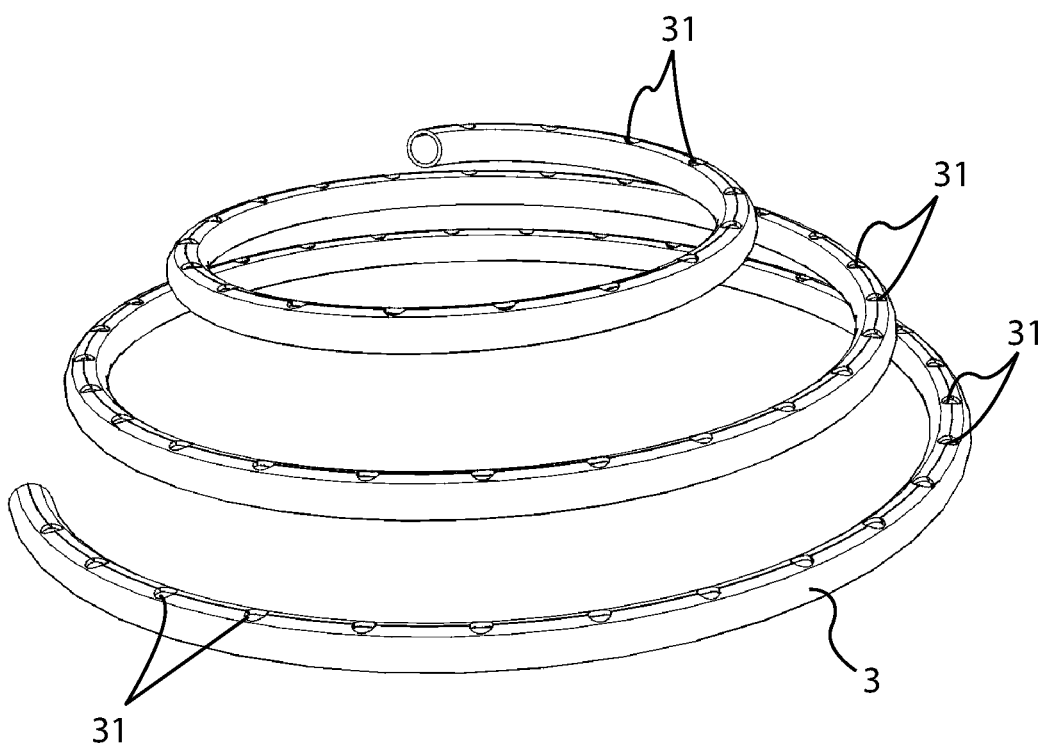
Figure 4:
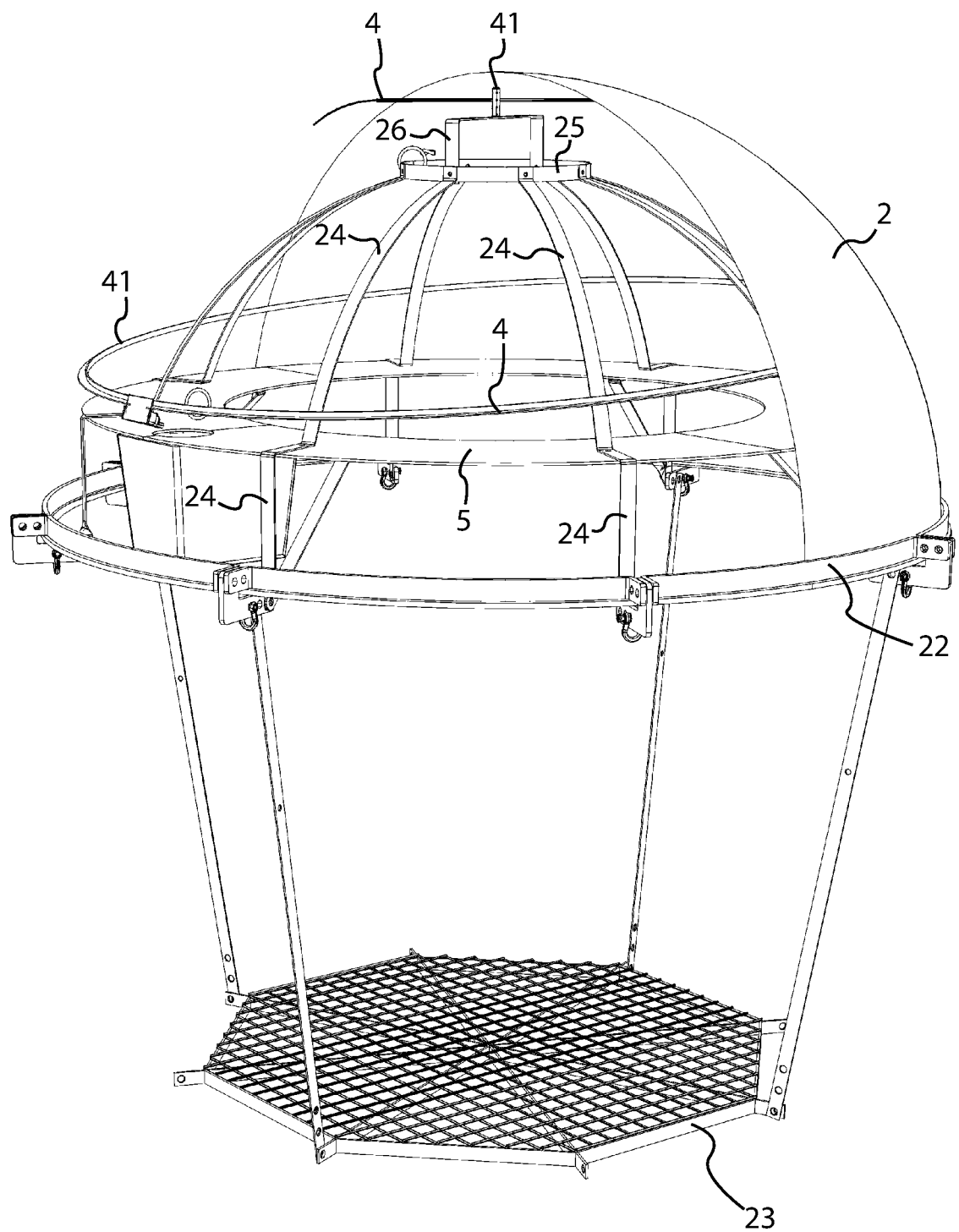
Figure 5:
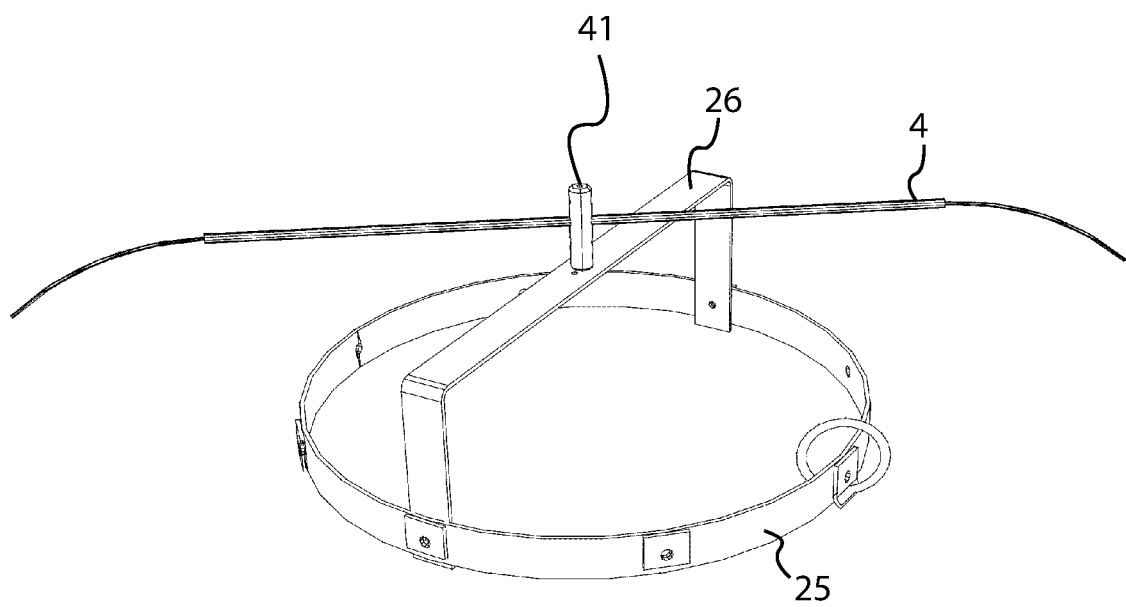

Further characteristics of the greenhouse are object of the dependent claims. The characteristics and the advantages of a greenhouse for underwater cultivation of plant species according to the present invention will be more apparent from the following exemplary and non-limiting description, referred to the enclosed schematic drawings wherein:

FIG. 1 is a schematic view of the greenhouse as a whole;
FIG. 2 is a schematic view of the greenhouse of FIG. 1 without the dome;
FIG. 3 illustrates the tubular structure of the greenhouse automatic irrigation device, wherein plants are cultivated;
FIG. 4 is a schematic view of the greenhouse of FIG. 1 with the dome partially removed and without the tubular structure of FIG. 3;
FIG. 5 illustrates a device for collecting condensation from the inner surface of the dome.

Referring to the mentioned figures, the greenhouse for underwater cultivation comprises a dome 2 suitable for being filled with air in an underwater environment, provided with an aperture 21 for lower access and made of a material that is impermeable to water and permeable to light.

For the purposes of the present invention by dome it is meant any hollow body that can be filled with air in an underwater environment.

In the illustrated preferred embodiment, the dome is made of semi-rigid transparent plastic material (e.g. plexiglass)

In such an embodiment the balloon preferably comprises, at the aperture for lower access and around it, a rigid annular element 22 to which means restraining the dome to the sea floor are associated. Such restraining means also support a base 23, preferably made by means of a metal grid adapted to serve as a planking level for underwater operators who must access and work in the greenhouse. Such restraining means can be, e.g., a plurality of ropes or bars connected at the bottom with suitable anchors or ballasts.

Anchors can be made as shafts comprising an eyelet at an end, for connecting it to the ropes and, at the other end, a drill propeller to dig into sandy, muddy or in any case not rocky sea bottoms.

Such restraining means must guarantee an anchoring able to widely oppose to the hydrostatic lift due to the weight of water volume moved by the balloon filled with air.

From such a rigid annular element a plurality of support bars 24 extend upward having radius of curvature similar to the dome one, ending into a second ring 25. The greenhouse comprises means for adjusting the level of water in the greenhouse itself which must ensure that plant species always reside above such level. Such adjusting means can comprise on the top of the dome a first release valve for draining the internal air and at the lower open portion of the dome, integrated in its surface, it is provided a second valve for adjusting the level of internal water/air interface.

By means of such second valve it is possible to prevent excessive air from filling the dome with the subsequent risk of uplifting from the bottom and/or laceration/break thereof.

Such second valve is necessary to allow operability of an underwater operator inside the dome: it limits the quantity of air contained, avoiding that air exhaled by an underwater operator fills the dome itself up until braking or detaching it from the bottom. The two valves (upper and lower can be integrated into one single system).

According to the present invention inside such dome an automatic irrigation system for cultivated plants is present.

Such system comprises a tubular structure 3 on which a plurality of mutually spaced holes 31 are provided, inside which supports for housing and cultivating plant species are placed. Inside such tubular structure irrigation water flows irrorating such supports, such as to achieve a hydroponic culture.

By hydroponic culture it is meant a soilless cultivation technique: the ground is replaced by a very small quantity of inert substrate (expanded clay, perlite, vermiculite, coir, mineral wool, zeolite, etcetera) wherein the seed is immersed. The plant is irrigated with a nutrient solution composed of water and the compounds (mostly inorganic) necessary for conveying all the essential elements for the normal mineral nutrition. The technique is otherwise known with the term NFT Nutrient Film Technique. Hydroponic culture allows controlled outputs either from a qualitative and health-hygiene point of view during the whole year.

Such kind of cultivation has clear advantages in environments where the substrate is not able to make the culture grow optimally, as for instance in an underwater environment. Another advantage of this kind of cultivation is the lesser use of water for achieving the same result, approximately of one tenth with respect to the soil culture, making this system particularly useful in such environmental situations.

According to the present invention such supports for each plant are substantially funnel-shaped fitting into holes 31 such that the roots of the plant species, placed near the narrow lower end of the funnel, come into contact with the irrigation water flowing inside the tubular structure. The tubular structure is positioned with its upper end near the top of the dome and with its lower end near the lower end of the dome itself, such as to allow irrigation water fed from the upper end to descend downwardly towards a lower collection tank 32. From such tank, a pump and a small tube (not illustrated) bring the water back to the top of the tubular structure creating a continuous circulation of water in the structure 3.

Advantageously, such tubular structure is spiral-shaped, such as to make optimal use of the space inside the dome.

The greenhouse further comprises a device for collecting condensation from the inner surface of the dome including a movable blade 4, which adheres to the transparent inner surface of the dome, on which due to the strongly damp environment, a multiplicity of water drops is formed.

Such blade collects the drops with its movement, which, due to weight gain, slide down along the inner surface and are conveyed into at least one collection gutter 41, positioned on the inner walls of the dome. Such gutter is arranged along a downhill path, terminating near the collection tank 32, so that the water collected on the inner walls of the dome is then transported from the gutter to such tank. The blade 4 is preferably supported by a pin 42 placed on top of the dome, which allows its rotation through suitable motorised means.

It is substantially curved as the dome, in order to operate substantially like a windshield wiper on the transparent lower surface of the dome itself. Such pin is preferably supported by a bracket 26 placed on the second ring 25.

Advantageously the dome has in its interior also at least a support shelf 5 for operators and for positioning electronic apparatuses present inside the greenhouse. Such shelf being restrained and supported by such support bars 24. Such apparatuses comprise sensors for air and surrounding water temperature, humidity, water level, carbon dioxide, oxygen, light and whatever is useful for the climatic control of the biosphere and all the electronic apparatuses for audio video communication, surveillance and piloting of the various utilities (water pumps, fans, lighting system, windscreen wipe . . . ) in addition to the forwarding of all data to the surface for implementing a remote monitoring.

There are also control electronic boards for the condensation collection device for potential lighting systems of the solar power type (not illustrated), fans, etcetera.

According to an additional characteristic (not illustrated) of the present invention inside the greenhouse a condensation and water collection device for irrigation is present, which in turn supplies such tank 32. Such condensation device comprises a tube for collecting cold water below the dome, preferably adapted to take water at depths below the dome.

Such cold water is transported by for example a suitable pump to a coil placed in a condenser compartment. Due to the difference in temperature caused by the cold water in the coil and the surrounding environment, which is strongly humid, water is condensed inside such compartment, which can advantageously be conveyed into such tank 32. Obviously for this purpose the condensation device is positioned near such tank.

The Applicant has observed that the growth environment which is created inside the underwater greenhouse is able to self-sustain substantially independently from human intervention thanks to such automatic irrigation system.

In fact, the photosynthesis cycle limited to elements present inside the greenhouse makes it useless to reintegrate with oxygen and/or carbon dioxide the atmosphere inside the balloon for the whole growth period of what seeded. Thanks to the air/water interface present at the aperture for lower access of the balloon, the inner atmosphere is highly humid, leading to the creation of fresh water condensation on the inner walls of the dome.

This is also eased by the possibility of sufficiently limiting crop dehydration, placing the greenhouse at the most suitable depth, and thus selecting light frequencies which cultivations are subjected to, filtered by the absorption of the overlying water column.

The temperature inside the greenhouse is substantially constant due to the thermal hysteresis of the surrounding water which reduces the atmospheric thermal ranges which cultures are subjected compared to surface cultivations. Finally, the insulated environment inside the greenhouse makes it totally unlike that crops undergo contaminations by micro-organisms as, for instance, parasites. Finally, it is clear that the greenhouse for the underwater cultivation of terrestrial plant species as conceived herein can be subjected to many modifications and variants, all falling within the invention; furthermore, all the details can be replaced by technically equivalent elements. In practice, the materials used, as well as their dimensions, can be of any type according to the technical requirements.

The invention claimed is:

1. Greenhouse for underwater cultivation of terrestrial plant species comprising
    a dome (2) suitable for being filled with air in an underwater environment, provided with an aperture (21) for lower access and made of a material that is impermeable to water and permeable to light, such dome comprising means for restraining to the sea floor,
    means for adjusting the level of water and air in the dome itself which must ensure that the plant species cultivated in the greenhouse always reside above the water level, characterised in that a system for automatic irrigation of the cultivated plants is present inside such dome, such system comprising a tubular structure (3) on which a plurality of mutually spaced holes (31) are provided, inside which supports are placed for housing and cultivating plant species, irrigation water flowing inside such tubular structure and irrigating such supports in order to achieve a hydroponic culture.

2. Greenhouse according to claim 1, wherein such supports for each plant are substantially funnel-shaped so as to allow the roots of the plant species, placed near the narrow lower end of the funnel, to come into contact with the irrigation water flowing inside the tubular structure.

3. Greenhouse according to claim 1, wherein the tubular structure is positioned with its upper end near the top of the dome and with its lower end near the lower end of the dome itself, so as to allow irrigation water fed from the upper end to descend downwardly towards a lower collection tank (32), from such tank, a pump and a small tube bring the water back to the top of the tubular structure creating a continuous circulation of water in the structure itself.

4. Greenhouse according to claim 1, wherein the tubular structure is spiral-shaped, so as to make optimal use of the space inside the dome.

5. Greenhouse according to claim 1, further comprising a device for collecting condensation from the inner surface of the dome that includes a movable blade (4), which adheres to the transparent inner surface of the dome, on which due to the strongly damp environment, a multiplicity of water drops is formed, such blade collects the drops with its movement, which drops, due to weight gain, slide down along the inner surface and are conveyed into at least one collection gutter (41), positioned on the inner walls of the dome, such gutter being arranged along a downhill path, terminating near the collection tank (32), so that the water collected on the inner walls of the dome is then transported from the gutter to such tank.

6. Greenhouse according to claim 5, wherein the blade (4) is supported by a pin (42) placed on top of the dome, which allows its rotation through suitable motorised means.

7. Greenhouse according to claim 5, wherein the blade (4) is substantially curved as the dome, in order to operate substantially like a windshield wiper on the transparent lower surface of the dome itself.

8. Greenhouse according to claim 1, further comprising a condensation and water collection device for irrigation from the environment inside the greenhouse which in turn supplies such tank (32).

9. Greenhouse according to claim 8, wherein such condensation device comprises a tube for collecting cold water below the dome, which transports such water through a suitable pump to a coil placed in a condenser compartment, due to the difference in temperature caused by the cold water in the coil and the surrounding environment, strongly humid and warmer, water is condensed inside such compartment, which is conveyed into such tank (32).

10. Greenhouse according to claim 1, wherein the dome is made of semi-rigid transparent plastic material, for example plexiglass.

11. Greenhouse according to claim 1, wherein such means for restraining to the sea floor also support a base (23) adapted to serve as a planking level for underwater operators who must access and work in the greenhouse.

* * * * *